(12) United States Patent
Hoegerle et al.

(10) Patent No.: US 12,440,226 B2
(45) Date of Patent: Oct. 14, 2025

(54) MEDICAL DEVICE AND COOLING-FLUID/RINSING-FLUID HOSE

(71) Applicant: Aesculap AG, Tuttlingen (DE)

(72) Inventors: Roland-Alois Hoegerle, Tuttlingen (DE); André Buerk, Villingen-Schwenningen (DE); Uwe Schaz, Neuhausen (DE); Martin Machill, Rietheim-Weilheim (DE); Simone Hermle, VS-Villingen (DE); Saul Dufoo Ochoa, Tuttlingen (DE)

(73) Assignee: Aesculap AG, Tuttlingen (DE)

( * ) Notice: Subject to any disclaimer, the term of this patent is extended or adjusted under 35 U.S.C. 154(b) by 296 days.

(21) Appl. No.: 17/920,685

(22) PCT Filed: Apr. 21, 2021

(86) PCT No.: PCT/EP2021/060333
§ 371 (c)(1),
(2) Date: Oct. 21, 2022

(87) PCT Pub. No.: WO2021/214112
PCT Pub. Date: Oct. 28, 2021

(65) Prior Publication Data
US 2023/0218307 A1    Jul. 13, 2023

(30) Foreign Application Priority Data
Apr. 23, 2020  (DE) .................... 10 2020 111 149.5

(51) Int. Cl.
*A61B 17/16*    (2006.01)
*A61B 17/00*    (2006.01)

(52) U.S. Cl.
CPC ...... *A61B 17/1644* (2013.01); *A61B 17/1622* (2013.01); *A61B 2017/00477* (2013.01); *A61B 2017/1651* (2013.01)

(58) Field of Classification Search
CPC ............ A61B 17/1644; A61B 17/1622; A61B 2017/00477; A61B 2017/1651
See application file for complete search history.

(56) References Cited

U.S. PATENT DOCUMENTS

| 9,089,347 B2 | 7/2015 | Sankaran et al. |
| 9,592,087 B2 | 3/2017 | Brunnett et al. |
| (Continued) | | |

FOREIGN PATENT DOCUMENTS

| CH | 632462 | 10/1982 |
| DE | 2606062 A1 | 8/1977 |
| (Continued) | | |

OTHER PUBLICATIONS

Office Action received in Japanese Application No. 2022-564033 dated Nov. 12, 2024, with translation, 7 pages.
Search Report received in German Application No. 10 2020 111 149.5 dated Feb. 19, 2021, with translation, 13 pages.
Search Report received in International Application No. PCT/EP2021/060333, dated Jul. 30, 2021, with translation, 6 pages.
(Continued)

*Primary Examiner* — Tan-Uyen T Ho
*Assistant Examiner* — Cherie M Poland
(74) *Attorney, Agent, or Firm* — Christopher A. Rothe; CM Law

(57) ABSTRACT

A medical device, a cooling-fluid/rinsing-fluid hose, and a method for using a medical device. The medical device includes a handpiece with an interior enclosed by a handpiece housing, preferably for receiving a drive. The medical device also has an effector arranged on or coupleable to the handpiece and a supply device for supplying cooling fluid and/or rinsing fluid to the effector. The supply device includes a guide tube or guide cannula that passes through the interior in the handpiece longitudinal direction and is rigidly connected to the handpiece. The guide tube or guide cannula, which opens to the outside in a distal and in a (Continued)

proximal handpiece region, longitudinally guides a preferably single-use cooling-fluid/rinsing-fluid hose that is pushed into the guide tube.

15 Claims, 8 Drawing Sheets

(56) References Cited

U.S. PATENT DOCUMENTS

| | | | | |
|---|---|---|---|---|
| 2004/0153111 A1* | 8/2004 | Hosoada | ........ | A61B 17/320016 |
| | | | | 604/48 |
| 2007/0239187 A1* | 10/2007 | Brunnett | ............ | A61B 17/1622 |
| | | | | 606/172 |
| 2019/0059996 A1* | 2/2019 | Duncan | .................. | A61M 11/02 |

FOREIGN PATENT DOCUMENTS

| | | | |
|---|---|---|---|
| EP | 3281615 | A2 | 2/2018 |
| FR | 2930422 | A1 | 10/2009 |
| GB | 1561227 | A | 2/1980 |
| GB | 2030121 | A | 4/1980 |
| JP | WO2002089722 | A1 | 8/2004 |
| JP | 2005118295 | A | 5/2005 |
| JP | 2009542422 | A | 12/2009 |
| JP | 2010528775 | A | 8/2010 |

OTHER PUBLICATIONS

Written Opinion received in International Application No. PCT/EP2021/060333, dated Jul. 30, 2021, with translation, 14 pages.

* cited by examiner

MEDICAL DEVICE AND COOLING-FLUID/RINSING-FLUID HOSE

CROSS-REFERENCE TO RELATED APPLICATIONS

This application is the United States national stage entry of International Application No. PCT/EP2021/060333, filed Apr. 21, 2021, and claims priority to. German Application No. 10 2020 111 149.5, filed Apr. 23, 2020. The contents of International Application No. PCT/EP2021/060333 and German Application No. 10 2020 111 149.5 are incorporated by reference herein in their entireties.

FIELD

The invention relates to a medical device, a cooling-fluid/rinsing-fluid hose and a method of using a medical device in conjunction with the cooling-fluid/rinsing-fluid hose.

BACKGROUND

Medical devices, in particular surgical devices in the form of hand-held devices such as hand-held drills or hand-held milling cutters, are already known from the prior art, which provide a supply of rinsing fluid through a hose or tube fixedly attached to the outside of the hand-held device or a supply of rinsing fluid through a passageway fixedly guided inside the hand-held device. In particular, a sterile rinsing set (bag/hose combination) is usually connected or coupled to the hose or tube to rinse a sterile rinsing fluid through the hose or tube. The sterile fluid has to leave the sterile hose and then passes through the hose or tube guided on or in the handpiece to the tool/site. The hose or tube usually has a small internal diameter due to the low rinsing volume or the low rinsing flow rate, respectively.

Consequently, the prior art has several disadvantages. For example, there is a risk of contamination. In this example, there may be contaminants and/or germs in the sterile rinsing fluid due to an unclean internal handpiece hose/tube. Furthermore, there may be a risk of clogging of the hose/tube or a tendency to do so. The narrow hoses/tubes may tend to clog due to the deposition of residues, for example salt crystals from isotonic saline solution that passed through. In this case, mechanical cleaning is necessary, e.g. with wire.

Externally mounted or clamped spray nozzles may also have the disadvantage of obstructing visibility and ergonomic disadvantages, for example when mounted in the viewing and holding area. Furthermore, attaching the clips may be complicated and require additional components, for example in the case of handpiece-dependent clips. In this case, a universal clip may be a compromise solution that is individually disadvantageous. Coiled variants are sometimes expensive.

However, the prior art always has the disadvantage that maintenance of cleanliness is complex and expensive.

There may be a need to provide concepts for medical devices in conjunction with a cooling-fluid/rinsing-fluid hose that improve maintenance of cleanliness.

SUMMARY

It is thus the object of the invention to avoid or at least mitigate the disadvantages of the prior art. In particular, maintenance of cleanliness with ease of handling is to be improved.

This object is solved in a generic device according to the invention by providing a medical device. The medical device has a handpiece. The handpiece has an interior enclosed by the handpiece housing, preferably for receiving a drive. The medical device has an effector. The effector is arranged on the handpiece or is coupleable thereto. The medical device furthermore has a supply device for cooling and/or rinsing fluid to the effector. The supply device has a guide tube or a guide cannula. The guide tube or the guide cannula passes at least partially through the interior in the longitudinal direction of the handpiece. Furthermore, the guide tube or the guide cannula is fixedly connected to the handpiece. The guide tube or the guide cannula opens outward in a distal and a proximal handpiece region. Furthermore, the guide tube or the guide cannula is provided and configured to longitudinally guide a cooling-fluid/rinsing-fluid hose, preferably of the single-use type, inserted into the guide tube during its insertion movement.

This has the advantage that disposable hoses can be used, which can maintain cleanliness of the medical device or of its supply device for cooling and/or rinsing fluid. This also allows easy orienting of a direction of effect of a fluid jet provided by the guide tube or the guide cannula according to the effector, for example a tool. The handpiece may be a surgical handpiece for receiving a tool usable for surgical treatment.

Thus, the medical device may be a surgical device that includes a handpiece. The handpiece or medical device may be battery powered. For this purpose, the battery may be detachably connected to the handpiece or may be dedicatedly connected to the handpiece. Also, a power supply may be provided via wired energy supply.

In particular, the cooling-fluid/rinsing-fluid hose may be provided for intraoperative supply/feeding of fluids, such as a functional medium, for example for ultrasound or for cooling and rinsing of tools attached to the handpiece, the application site and the environment, for example bone, tissue or the like, during surgery. The tool may be a sawing tool, milling tool, drilling tool, ultrasonic tool, high frequency tool, or laparoscopic tool.

The supplied fluid may be provided in the form of a functional medium, for example an isotonic saline solution, NaCl. The fluid can be transported from a rinsing fluid container as part of the medical device via the cooling-fluid/rinsing-fluid hose to the surgical site.

The guide tube or the guide cannula may be configured to enter the interior of the handheld device at a distal end/end region of the handheld device and to exit the interior of the handheld device at a proximal end/end region of the handheld device. Specifically, the guide tube or the guide cannula may be freely configured, for example, continuous without elements/parts. In this case, the guide tube or the guide cannula may be an open tube. The open tube may have two connection points to the outside.

In particular, it may be provided that the cooling-fluid/rinsing-fluid hose passes through the guide tube or guide cannula during operation. In particular, the hose length of the cooling-fluid/rinsing-fluid hose may be greater than the length of the guide tube or guide cannula, so that the cooling-fluid/rinsing-fluid hose extends at least through the entire guide tube or guide cannula. For this purpose, the guide tube or the guide cannula or the cooling-fluid/rinsing-fluid hose may be provided such that in an uncompressed state of the cooling-fluid/rinsing-fluid hose, the cooling-fluid/rinsing-fluid hose has a larger outer circumference than a diameter of the guide tube or of the guide cannula. The diameter of the guide tube or of the guide cannula and/or of the cooling-fluid/rinsing-fluid hose may be substantially the same along its entire length. Variations in diameter due to manufacturing are intended to be covered by the term 'substantially'. The circumference of the cooling-fluid/rinsing-fluid hose may be compressible so as to be slidable through the guide tube or the guide cannula. Likewise, the cooling-fluid/rinsing-fluid hose may be configured to be flexible. A blunted and/or closed tip of the cooling-fluid/rinsing-fluid hose may facilitate pushing through the guide tube or the guide cannula.

Advantageous embodiments are explained in more detail below.

The guide tube or the guide cannula may have a number of outlet openings into the interior in its longitudinal section within the interior and preferably may be perforated.

This allows a motor mounted in the interior to be easily cleaned, for example by connecting a cleaning hose to the guide tube (without a coolant hose inserted therein).

The guide tube or the guide cannula may be arranged decentrally, close to or adjacent to the inside of the handpiece housing enclosing the interior.

This saves space and keeps the length of the tube short.

In addition, the guide tube or the guide cannula may, starting from an end portion projecting distally from the handpiece housing obliquely with respect to the longitudinal axis of the handpiece and forming an exclusively obliquely oriented inlet port, transition smoothly into a central region within the interior, which extends parallel to the longitudinal axis of the handpiece. The central region may smoothly open into an end portion projecting proximally from the handpiece housing obliquely with respect to the longitudinal axis of the handpiece and forming an exit port. The end portion may be bent outside the handpiece housing to form an outlet end piece extending parallel to the longitudinal axis of the handpiece in the proximal direction.

This allows the tube to be arranged in an optimally shaped manner in a grip region of the handpiece.

In particular, the central region with the respective end portions may be curved, for example S-shaped.

When the cooling-fluid/rinsing-fluid hose is pulled out, the inlet port may additionally configure a coupling for connecting a cleaning fluid line.

As a result, the tube can be cleaned in a simple manner after use.

The object defined above is also solved in a generic device according to the invention by providing a flexible cooling-fluid/rinsing-fluid hose for insertion thereof into a guide tube of a medical device, preferably according to a medical device described above. A hose end of the cooling-fluid/rinsing-fluid hose may be closed under formation of or via an end cap curved or rounded outward, thus forming the hose end to be inserted into the guide tube.

Thus, the maintenance of cleanliness of the medical device can be improved.

The cooling-fluid/rinsing-fluid hose may be provided for single use (single-use, disposable hose). The cooling-fluid/rinsing-fluid hose may be made of a plastic. In particular, the cooling-fluid/rinsing-fluid hose may be a plastic cannula. Like this, the cooling-fluid/rinsing-fluid hose can be manufactured at a low cost. For example, the plastic may include soft plastics such as polyethylene, polyurethane, or polyvinyl chloride. As a result, maintenance of cleanliness may be increased.

Furthermore, a tip of the cooling-fluid/rinsing-fluid hose may be closed or configured as such. The shape of the closure may be round to the risk of injury and to increase an ease of sliding through into the guide tube or the guide cannula of the medical device.

In particular, this may further increase the maintenance of cleanliness.

The cooling-fluid/rinsing-fluid hose may have, starting from the hose end to be inserted, several different, preferably increasing, diameter regions in the longitudinal direction of the hose, which are arranged in series with continuous transitions or with the formation of shoulders. For example, the cooling-fluid/rinsing-fluid hose may have multiple inner-diameter regions. In this case, the inner diameters may decrease from the tip along the cooling-fluid/rinsing-fluid hose. Indicators on the cooling-fluid/rinsing-fluid hose may indicate how large the inner diameter is along the cooling-fluid/rinsing-fluid hose away from the tip.

The object defined above may also be solved by providing a method of using a medical device, preferably as described above, in conjunction with a cooling-fluid/rinsing-fluid hose, preferably as described above, provided for supplying fluid. The method comprises providing a medical handpiece, the handpiece housing of which forms an interior. A hose guide tube having a distal tube entrance and a proximal tube exit is fixedly mounted in the interior, respectively outside the handpiece housing. The hose guide tube may be the guide tube or the guide cannula as described above, and vice versa. The method comprises inserting a cooling-fluid/rinsing-fluid hose sealed at the insertion end from outside the handpiece housing into the distal tube entrance and pushing the cooling-fluid/rinsing-fluid hose through the guide tube to or beyond the proximal tube exit. The method comprises, after guiding the cooling-fluid/rinsing-fluid hose through the guide tube, cutting off the closed insertion end of the cooling-fluid/rinsing-fluid hose protruding from the tube exit.

Thus, the maintenance of cleanliness of the medical device can also be improved.

Furthermore, cutting the tip of the cooling-fluid/rinsing-fluid hose guided through the guide tube or the guide cannula may be performed prior to an operation in which the handpiece or the medical device is used. Likewise, cutting off the insertion end, also referred to herein as the tip, of the cooling-fluid/rinsing-fluid hose guided through the guide tube or the guide cannula may be performed after surgery. In this regard, further cutting of the tip formed by the cutting may be performed after the operation.

Afterwards, the cooling-fluid/rinsing-fluid hose can be pulled out of the guide tube or the guide cannula. If cut off after surgery, the sterility of the guide tube or of the guide cannula can also be improved.

The interior of the handpiece may furthermore house a functional unit, for example a drive unit in the form of an electric motor, an oscillation unit or a high-frequency module. The functional unit may be configured to interact with the tool in order to perform the corresponding operation. When the functional unit is operated, the cooling-fluid/rinsing-fluid hose may furthermore be operated or fluid may be simultaneously provided from the associated rinsing fluid container. For this purpose, a pump may be provided in connection with the rinsing fluid container that pumps fluid from the rinsing fluid container through the cooling-fluid/rinsing-fluid hose provided by the guide tube or the guide cannula.

The cooling-fluid/rinsing-fluid hose may have an outer circumference adapted to a circumference of a guide tube or guide cannula contained in a medical device. In particular, the cooling-fluid/rinsing-fluid hose may be configured to be guided by a user in a targeted manner through the guide tube or guide cannula within the handpiece of the medical device from outside the handpiece.

In this way, maintenance of cleanliness of medical devices or their tubes, respectively, can be achieved. In particular, the medical device may be a handpiece of a surgical apparatus/device.

Conversely, the circumference of the guide tube/guide cannula contained in the medical device may also be adapted to the outer circumference of the cooling-fluid/rinsing-fluid hose.

In other words, the invention relates to a supply of cooling and rinsing fluid in surgical handpieces. In particular, a supply of cooling and rinsing fluid may be provided via a flexible single-use spray nozzle/cannula, which is passed through a cannulation wholly or partially internally through a surgical handpiece. The handpiece cannulation may also be provided for internal rinsing of the handpiece during cleaning/disinfection.

In one or more embodiments, a handpiece may include a cannulation that passes wholly or partially internally through the handpiece. Examples include tubes made of steel, plastic, silicone, or the like. In particular, the handpiece may be 3D printed.

In one or more embodiments, the single-use, flexible plastic cannula may be pushed from behind through the cannulation and on to the application position. A universal length of the cannula may allow cutting to provide fabrication of a custom, ideal nozzle length based on indication or user preference. After use, the single-use plastic cannula is withdrawn from the cannulation and disposed of. The cannulation may have one or more openings for the interior of the handpiece.

In other words, the present invention thus has one or more of the advantages listed below. Sterility of the rinsing fluid in the rinsing set (bag/hose combination) can be maintained. The sterile rinsing fluid flows through only sterile single-use components from the bag to the tool/situs. Internal cannulation in the handpiece can remain clean, preventing contamination and clogging of the tube. In order not to carry contamination into the cannulation when retracting the cannula, a contaminated cannula tip can be cut off before retraction. Better cleanability of the cannulation can be provided since it has a larger diameter compared to the prior art. Use of the larger cannulation, which has one or more openings to the interior of the handpiece, can also be used for internal flushing of the handpiece during cleaning/disinfection. Here, for example, a coupling point for a rinsing adapter for rinsing the cannulation and the interior may be provided. Furthermore, a rinsing set may be provided, in particular a bag and hose with cannula. A single cannula with universal length for individual adaptation may also be provided. This can be used for several different handpieces. Furthermore, it may be advantageous that visual obstruction by the cannula is eliminated and ergonomic disadvantages are eliminated.

According to the same or a further embodiment, a flexible, single-use plastic cannula with a closed front tip may be provided. An advantage may be that there is no risk of clogging by pushing residues forward in the cannulation. After pushing through, cutting of the cannula tip to an individual, ideal length can be carried out according to the indication or the user's wishes. The cannula may be provided with stepped inner-diameter regions. Depending on the position of the cut when the cannula is cut off, different rinsing jet diameters can be selected.

The sections/regions may be color marked in this regard. The cannula may also be provided with conical inner-diameter regions. Depending on the position of the cut when the cannula is cut off, different rinsing jet diameters can be selected or provided in a continuously variable manner. Section regions may also be marked by color.

If it is stated in the present case that a component is 'connected' with another component, thus 'is in connection', this can mean that it is directly connected with it or accesses it directly; here it is to be noted however that a further component may lie between them. On the other hand, if it is said that a component is 'directly connected' to another component, this is to be understood to mean that there are no other components in between.

BRIEF DESCRIPTION OF THE DRAWINGS

The invention is explained below with the aid of drawings. The following is shown.

DETAILED DESCRIPTION

Figure 1A:
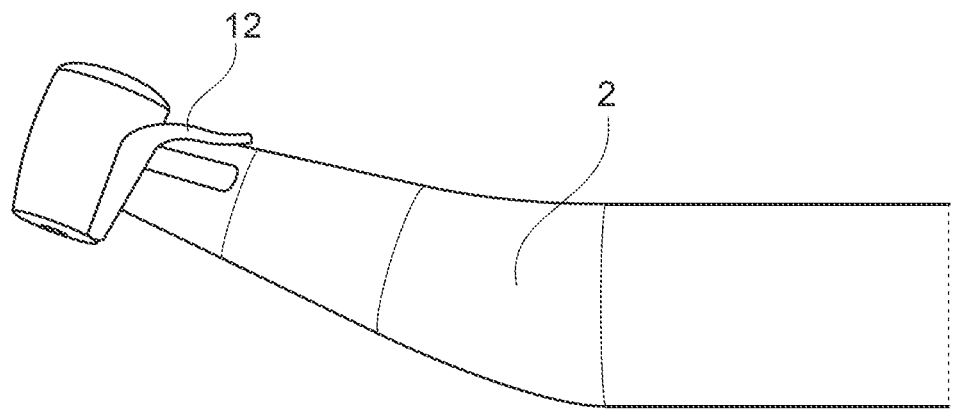
FIG. 1a shows a schematic representation of a first variant of a handpiece with fixedly attached rinsing tube.

The Figures are of a schematic nature only and are intended solely for the purpose of understanding the invention. Identical elements are provided with the same reference signs. The features of the individual embodiments can be interchanged.

In addition, spatially relative terms, such as 'located below', 'below', 'lower', 'located above', 'upper', 'left', 'on the left', 'right', 'on the right', and the like, may be used herein to simply describe the relationship of an element or of a structure to one or more other elements or structures shown in the Figures. The spatially relative terms are intended to include other orientations of the component in use or in operation in addition to the orientation shown in the Figures. The component may be oriented differently (rotated by 90 degrees or in a different orientation), and the spatially relative descriptors used herein may likewise be interpreted accordingly.

The medical device, in particular the handpiece, the method, and the cooling-fluid/rinsing-fluid hose are now described with reference to embodiments.

The principle of the present invention is to provide a sterile supply of cooling and/or rinsing fluid 5, hereinafter referred to as fluid, when using a handpiece 2 during surgery. In this regard, the handpiece 2 has a guide tube or a guide cannula 4, hereinafter referred to as tube, extending from a proximal end/end portion of the handpiece 2 through the handpiece interior to a distal end/end portion of the handpiece 2. The cooling and/or rinsing-fluid hose 1, hereinafter referred to as hose, which is provided for supplying the fluid 5 and is closed at the front, can be pushed through the tube 4. Before the operation, the tip of the hose 1 can be opened by cutting it off, for example with a knife or scissors. At the end of the operation, the hose 1 can be pulled out of the tube 4 again. Optionally, a cleaning process can still be provided after the hose 1 is removed from the tube 4. The hose 1 is discarded after removal from the tube 4.

Further details and aspects are mentioned in connection with the embodiments described above or below.

Figure 1B:
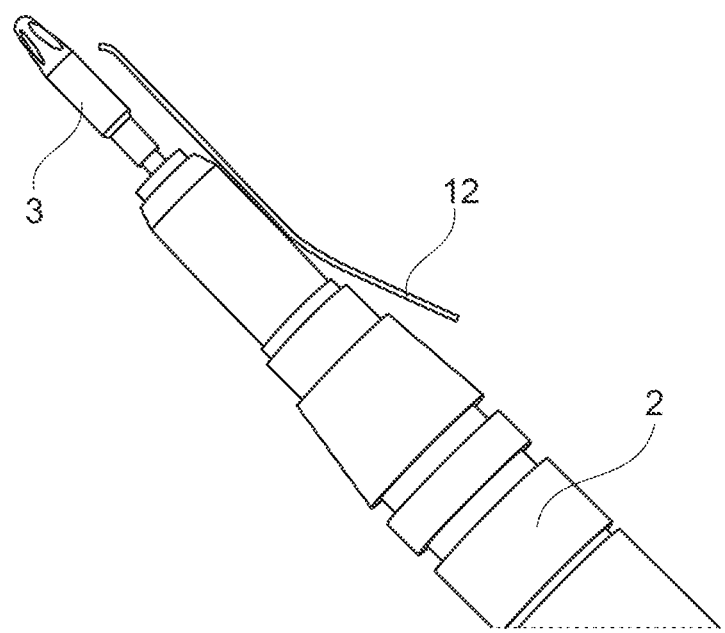
FIG. 1b shows a schematic representation of a second variant of a handpiece with a fixedly attached rinsing tube.
Figure 1C:
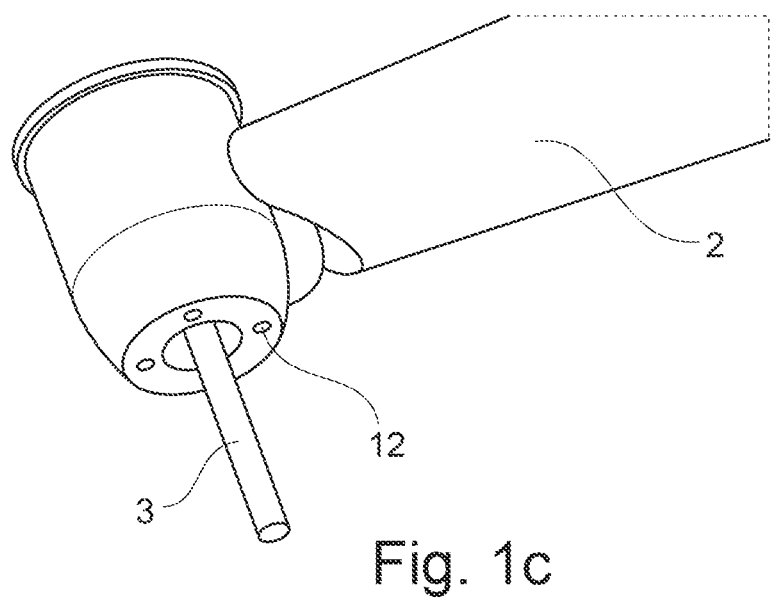
FIG. 1c shows a schematic representation of a third variant of a handpiece with integrated rinsing tube.

FIGS. 1a, 1b and 1c show different variants of a handpiece 2 with fluid supply 12 for flushing. In particular, FIG. 1a shows a handpiece 2 with a fixedly attached tube as fluid supply 12. FIG. 1b also shows a handpiece 2 with a fixedly attached tube as fluid supply 12 and attached tool 3. FIG. 1c shows a handpiece 2 with an integrated tube as fluid supply 12 and attached tool 3.

Further details and aspects are mentioned in connection with the embodiments described above or below. The embodiments shown in FIGS. 1a, 1b, and 1c may include one or more optional additional features corresponding to one or more aspects mentioned in connection with the proposed concept or embodiments described below with respect to FIGS. 2a to 5c.

Figure 2A:
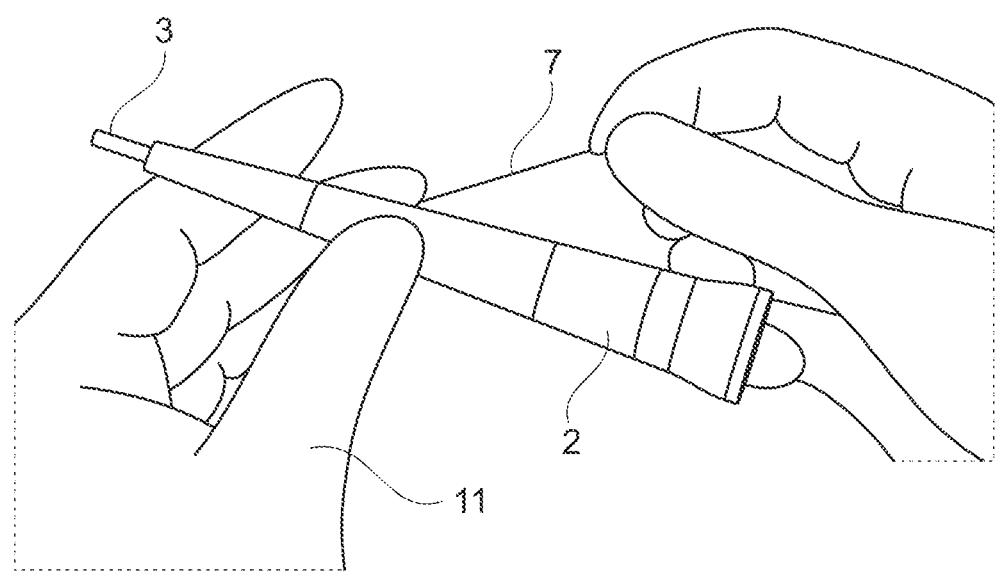
FIG. 2a shows a schematic representation for cleaning a rinsing tube on a handpiece.
Figure 2B:
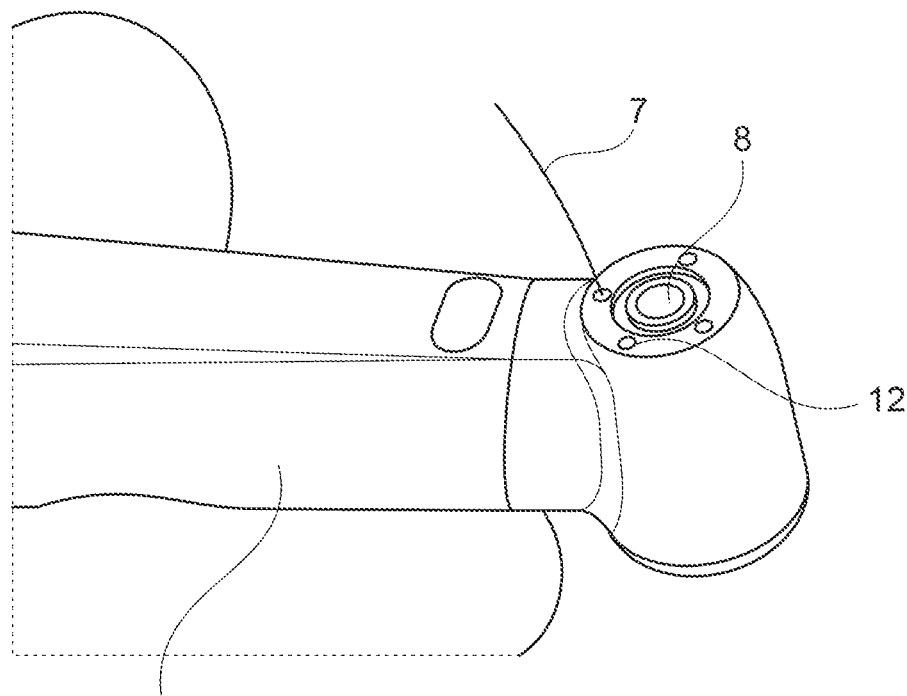
FIG. 2b shows a schematic representation for cleaning a rinsing tube in a handpiece.

FIGS. 2a and 2b show cleaning techniques for cleaning tubes as fluid supply 12 of different handpieces 2. FIG. 2a shows the cleaning of the tube as fluid supply 12 outside of the handpiece 2. FIG. 2b shows the cleaning of the tube as fluid supply 12 inside of the handpiece 2. FIG. 2a corresponds substantially to the arrangement in FIGS. 1a and 1b. FIG. 2b corresponds substantially to the arrangement in FIG. 1c.

Further details and aspects are mentioned in connection with the embodiments described above or below. The embodiments shown in FIGS. 2a and 2b may include one or more optional additional features corresponding to one or more aspects mentioned in connection with the proposed concept or one or more embodiments described above (e.g., FIG. 1) or below (e.g., FIGS. 3a to 5c).

Figure 3A:
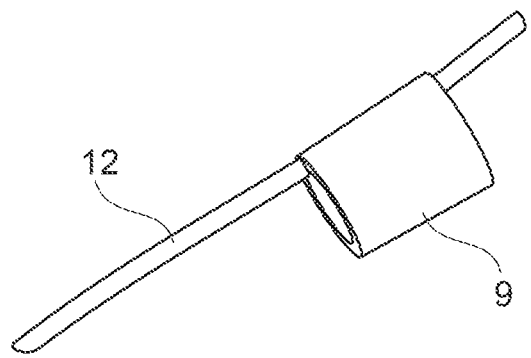
FIG. 3a shows a first schematic representation of a rinsing hose attachable to a handpiece.
Figure 3B:
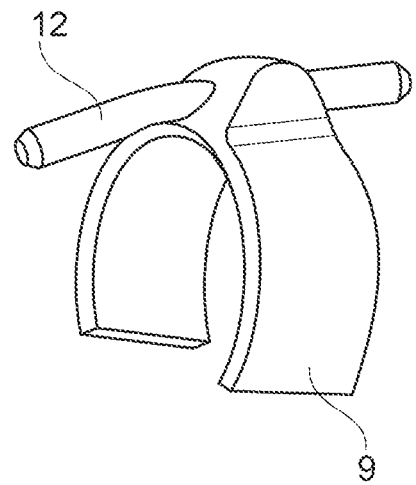
FIG. 3b shows a second schematic representation of a rinsing hose attachable to a handpiece.
Figure 3C:
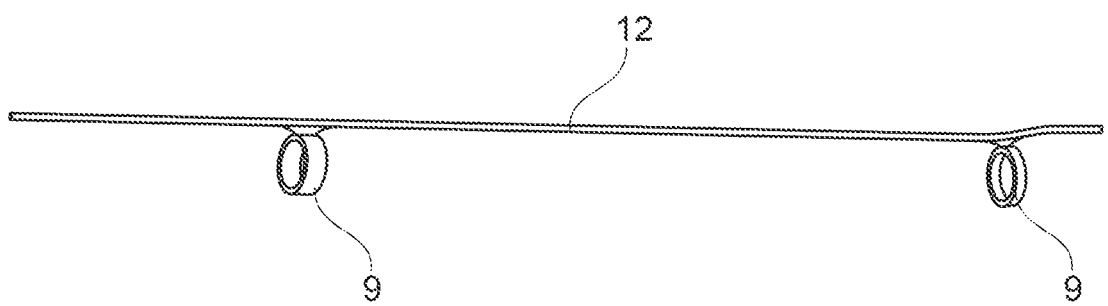
FIG. 3c shows a third schematic representation of a rinsing hose attachable to a handpiece.
Figure 3D:
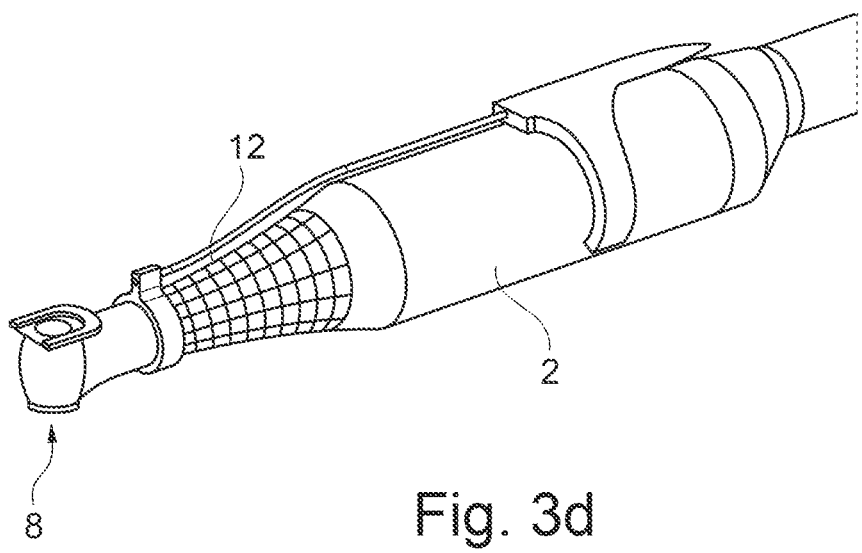
FIG. 3d shows a fourth schematic representation of a rinsing hose attachable to a handpiece.
Figure 3E:
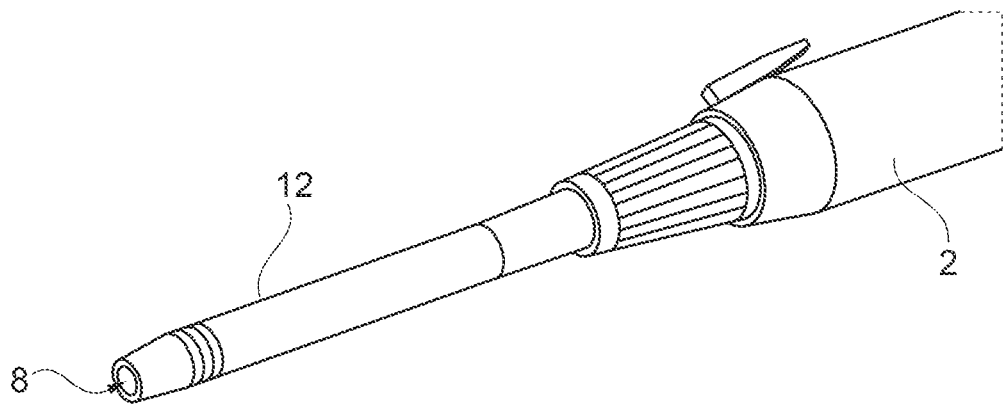
FIG. 3e shows a fifth schematic representation of a rinsing hose attachable to a handpiece.

FIGS. 3a to 3e show an embodiment in which a hose is attachable to a handpiece 2 as a fluid supply 12 via a fixing device 9. The hose is connectable or connected to the handpiece 2 by clamps as fixing device 9. The clamps may be detachably connected to the handpiece 2. In particular, the clamps may be spaced apart to save material of the fixing device 9. The hose is guided through a channel in the fixing device 9 or is fixedly connected thereto, respectively. FIGS. 3d and 3e show different types of tools with corresponding tool receptacles 8.

Further details and aspects are mentioned in connection with the embodiments described above or below. The embodiments shown in FIGS. 3a to 3e may include one or more optional additional features corresponding to one or more aspects mentioned in connection with the proposed concept or one or more embodiments described above (e.g., FIGS. 1 to 2b) or below (e.g., FIGS. 4a to 5c).

Figure 4A:
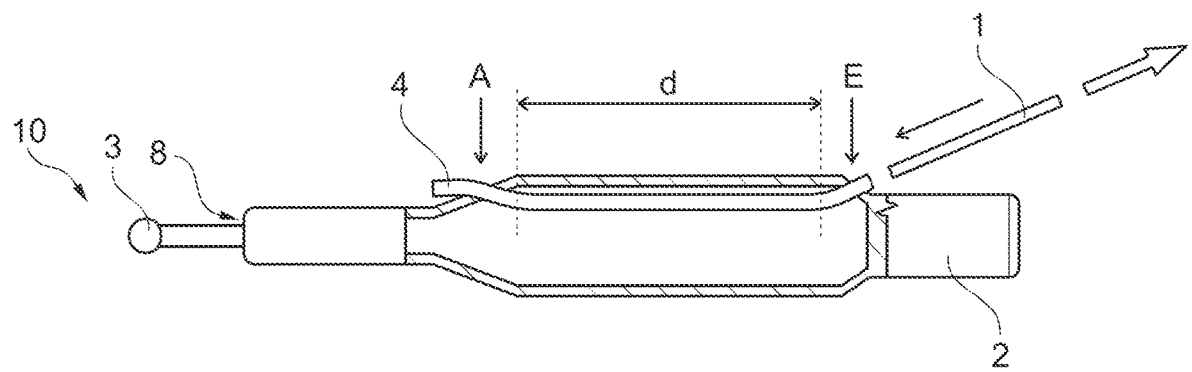
FIG. 4a shows a schematic representation of a handpiece before insertion of a cooling-fluid/rinsing-fluid hose.
Figure 4B:
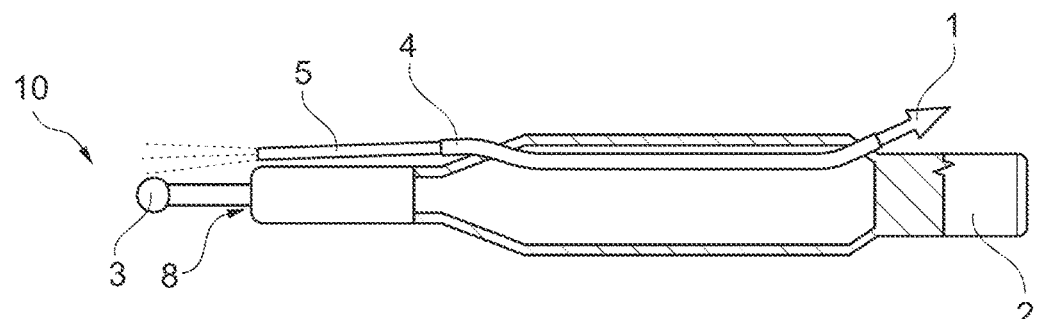
FIG. 4b shows a schematic representation of a handpiece with a cooling-fluid/rinsing-fluid hose in use.
Figure 4C:
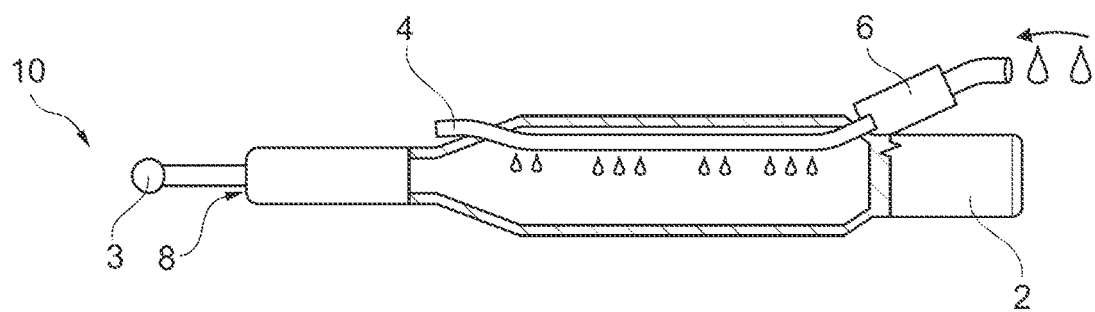
FIG. 4c shows a schematic representation of a handpiece with attached cleaning device.
Figure 5A:
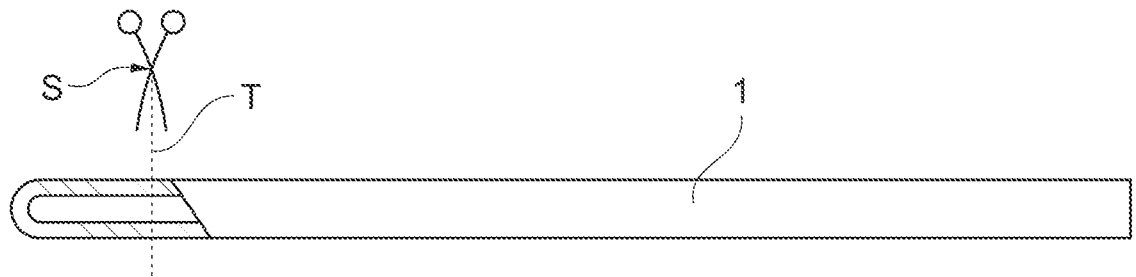
FIG. 5a shows a schematic representation of a cooling-fluid/rinsing-fluid hose.
Figure 5B:
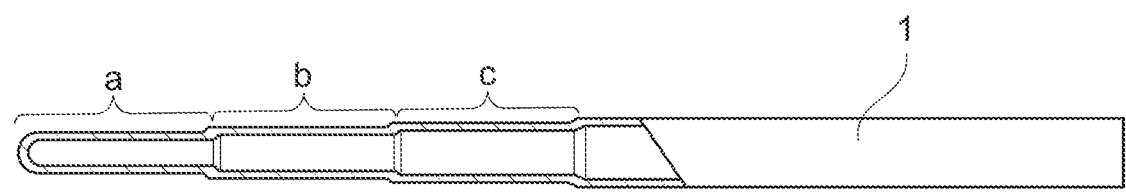
FIG. 5b shows a schematic representation of a cooling-fluid/rinsing-fluid hose with different inner-diameter regions.
Figure 5C:
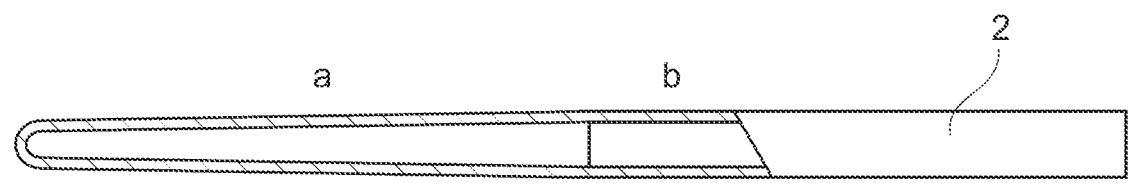
FIG. 5c shows a schematic representation of a cooling-fluid/rinsing-fluid hose with conical inner-diameter region.

FIGS. 4a to 4c, as well as FIGS. 5a to 5c, now illustrate the invention in yet other words. FIG. 4a shows a schematic representation of a handpiece 2 prior to the insertion of a hose 1 into a tube 4 contained in the handpiece 2. The tube 4 extends through an interior within the handpiece 2. Thus, the medical device may be referred to as handpiece 2 per se or as comprising the handpiece 2 and the tube 4. An outlet region A, also referred to as proximal end portion, is shown to the left of the region defined by the tube 4 within the interior of the handpiece, also referred to as central region, and an inlet region E, also referred to as the distal end portion, is shown to the right of the central region. The inlet region E is used for inserting the hose 1 into the tube 4. The tube 4 is configured to be open and has end pieces outside of the handpiece 2. The end pieces may be part of the inlet region E or of the outlet region A, respectively. The hose 4 may be inserted into the tube 4 from a distal end of the handpiece 2. The tube entrance of the inlet region E may protrude from the handpiece 2. The tube 4 in the outlet region A may be curved in an S-shape, such that the tube 4 has the same direction at two separate locations of the outlet region A, i.e. is parallel. The tube 4 may also protrude from the handpiece 2 in the inlet region E outside of the handpiece 2. In this respect, the tube in the inlet region E outside the handpiece 2 may project obliquely away from the handpiece 2.

The part of the tube 4 in the interior of the handpiece may be located within or may be surrounded by a grip section of the handpiece 2 to be grasped by the user during use. Thus, at this very part of the handpiece 2 that is provided for use by the hand, the corresponding portion of the tube 4 can be guided within the handpiece 4, thereby increasing comfort for the user.

FIG. 4b shows a schematic representation of the handpiece 2 with the hose 1 in use. In particular, the hose 1 is completely inserted through the tube 4. A rinsing jet of the fluid 5 is emitted on the left side of the hose 4 in the direction of effect of the tool 3, which is located in the tool receptacle 8. The fluid 5 can be dispensed during an operation. After the operation, the hose 1 can be pulled out of the tube 4. This case is shown in FIG. 4c.

FIG. 4c shows a schematic representation of the handpiece 2 with connected cleaning device 6. The cleaning device may be connected after the operation. For this purpose, the cleaning device 6 may dispense a cleaning fluid into the tube 4 to clean it. The cleaning fluid may contain, for example, alcohol or an oxidizing agent such as hydrogen peroxide for disinfection. For this purpose, the tube 4 has perforations in the interior, for example in the section between inlet region E and outlet region A, the so-called central region. The perforations may be provided for rinsing the interior via cleaning fluid delivered into the tube 4. For example, they may be provided or respectively distributed over a length of the central region d.

In particular, it should be noted here that a tip of the hose 1 can be cut off after the hose 1 has been pushed through the tube 4. This corresponds to the condition before the use in FIG. 4b. This or another cutting step can also be performed after the use in FIG. 4b before the hose 1 is retracted again. This will become clear in the following description of FIGS. 5a to 5c.

Further details and aspects are mentioned in connection with the embodiments described above or below. The embodiments shown in FIGS. 4a to 4c may include one or more optional additional features corresponding to one or more aspects mentioned in connection with the proposed concept or one or more embodiments described above (e.g., FIGS. 1 to 3e) or below (e.g., FIGS. 5a to 5c).

FIGS. 5a to 5c show a hose 4, firstly in a manner provided before use, see FIG. 5a, and secondly in two different embodiments, see FIGS. 5b and 5c.

In this respect, FIG. 5a shows a schematic representation of the hose 1. A cutting line T is also shown schematically. Furthermore, a pair of scissors is shown schematically, which is provided as an example of a cutting means S, which may also be a knife or the like with a sharp blade, for cutting the hose 1 along the cutting line T. This allows a tip of the hose 1 to be removed. In order for the hose 1 to be cuttable, an appropriate material may be provided for the hose 4. For example, the hose 4 may be made of plastic such as PVC or silicone. As described above with reference to FIGS. 4a to 4c, the hose 1 may be cut after it has been pushed through the tube 4, for example with the cutting means S along the cutting line. This can be done before the operation and/or after the operation.

Since the hose 1 is closed prior to use, germs and pathogens as well as other contaminants cannot enter the system or the interior of the hose 1. For this purpose, one end or both ends of the hose 1 can be closed before use. Both ends can then be cut at the aforementioned cutting line T for use. The cutting line T itself does not have to be present on the hose 1, it only serves to exemplify that the tip of the hose 1 is cut off before the fluid 5 is flushed through the hose 1.

FIG. 5b shows a schematic representation of the hose 1 with different inner-diameter regions a, b, and c. Here, the inner-diameter regions are smaller in the order a, b, and c away from the tip of the hose 1. This can provide a stepped inner diameter of the hose 1. For this purpose, the outer diameter of hose 1 may also be step-shaped or complementary to the inner diameter of hose 1. When cut off via the cutting means S at a point according to the corresponding inner-diameter region a, b or c, a rinsing jet diameter can be set. Thus, an optimal pressure of the rinsing fluid 5 can be provided during use.

FIG. 5c shows a further schematic representation of the hose 1, in this case with conical inner-diameter region a. The inner-diameter region b connected to it may be straight. This also allows, only in this case steplessly, a pressure of the fluid 5 selected for the application to be set via cutting means S depending on the position of the cut.

The hoses 1 shown in FIGS. 5b and 5c can thus flexibly provide a rinsing jet diameter of the fluid 5 preferred by the user.

The invention claimed is:

1. A medical device comprising:
 a handpiece comprising a handpiece housing that encloses an interior of the handpiece;
 an effector arranged on or coupleable to the handpiece; and
 a supply device for cooling and/or rinsing fluid to the effector,
 the supply device for cooling and/or rinsing fluid comprising a guide tube or guide cannula, at least a portion of which passes through the interior in a longitudinal direction of the handpiece,
 the guide tube or guide cannula fixedly connected to the handpiece and extending in the interior of the handpiece housing continuously from a proximal handpiece region to a distal handpiece region,
 the guide tube or guide cannula opening outwardly in the distal handpiece region and in the proximal handpiece region, and
 the guide tube or guide cannula being configured to longitudinally guide a cooling-fluid/rinsing-fluid hose as the cooling-fluid/rinsing-fluid hose is inserted into the guide tube or guide cannula.

2. The medical device according to claim 1, further comprising the cooling-fluid/rinsing-fluid hose,
 the cooling-fluid/rinsing-fluid hose having a hose length greater than a length of the guide tube or guide cannula so that the cooling-fluid/rinsing-fluid hose extends completely through said length of the guide tube or guide cannula.

3. The medical device according to claim 2, wherein the guide tube or guide cannula and the cooling-fluid/rinsing-fluid hose are configured such that, in an uncompressed state, the cooling-fluid/rinsing-fluid hose has a larger outer circumference than a diameter of the guide tube or guide cannula.

4. The medical device according to claim 1, wherein the guide tube or guide cannula has one or more outlet openings into the interior.

5. The medical device according to claim 1, wherein the guide tube or guide cannula is arranged in proximity to an inside of the handpiece housing.

6. The medical device according to claim 1, wherein the guide tube or guide cannula, starting from an end portion projecting distally from the handpiece housing obliquely with respect to a longitudinal axis of the handpiece and forming an inlet port that is exclusively obliquely oriented, transitions smoothly into a central region within the interior, which extends parallel to the longitudinal axis of the handpiece, which smoothly opens into an end portion projecting proximally from the handpiece housing obliquely with respect to the longitudinal axis of the handpiece and forming an exit port, the end portion being bent outside the handpiece housing to form an outlet end portion extending parallel to the longitudinal axis of the handpiece in a proximal direction.

7. The medical device according to claim 6, wherein, when the cooling-fluid/rinsing-fluid hose is pulled out of the interior of the handpiece, the inlet port additionally configures a coupling for connecting a cleaning fluid line.

8. The medical device according to claim 6, wherein regions where the central region are connected with the respective end portions are S-shaped.

9. The medical device according to claim 1, wherein the medical device further comprises a flexible cooling-fluid/rinsing-fluid hose for insertion into the guide tube or guide cannula, wherein the flexible cooling-fluid/rinsing-fluid hose has a first end configured to be closed or covered by an end cap, wherein the closed first end or end cap is curved outward to facilitate insertion into the guide tube or guide cannula.

10. The medical device according to claim 9, wherein the cooling-fluid/rinsing-fluid hose is provided for single use.

11. The medical device according to claim 9, wherein the cooling-fluid/rinsing-fluid hose has a plurality of different diameter regions starting from the first end and being arranged in a longitudinal direction of the flexible cooling-fluid/rinsing-fluid hose, the plurality of different diameter regions arranged in series with continuous transitions or with the formation of shoulders.

12. The medical device according to claim 1, wherein the guide tube or guide cannula is perforated.

13. The medical device according to claim 1 wherein the guide tube or guide cannula has:
- a distal end portion being arranged outside of the handpiece,
- an intermediate portion being arranged inside of the handpiece, and
- a proximal end portion, being arranged outside of the handpiece,
- wherein the distal end portion, the intermediate portion and the proximal end portion are interconnected to form one single piece.

14. The medical device according to claim 1, wherein the guide tube or guide cannula enters the interior of the handpiece housing at the proximal handpiece region, exits the interior of the handpiece housing at the distal handpiece region, and extends continuously from the proximal handpiece region to the distal handpiece region.

15. A method for using a medical device comprising:
- a handpiece comprising a handpiece housing that encloses an interior of the handpiece;
- an effector arranged on or coupleable to the handpiece;
- a supply device for cooling and/or rinsing fluid to the effector; and
- a guide tube or guide cannula that passes at least partially through the interior in a longitudinal direction of the handpiece,
- the guide tube or guide cannula fixedly connected to the handpiece,
- the guide tube or guide cannula opening outwardly in a distal handpiece region and in a proximal handpiece region,
- the guide tube or guide cannula being configured to longitudinally guide a cooling-fluid/rinsing-fluid hose as the cooling-fluid/rinsing-fluid hose is inserted into the guide tube or guide cannula, wherein
- the medical device further comprises a flexible cooling-fluid/rinsing-fluid hose for insertion into the guide tube or guide cannula, wherein the flexible cooling-fluid/rinsing-fluid hose has a first end configured to be closed or covered by an end cap, wherein the first end or end cap is curved outward to facilitate insertion into the guide tube or guide cannula,
- the method comprising the steps of:
- inserting the closed first end of the flexible cooling-fluid/rinsing-fluid hose from outside the handpiece housing into a tube exit opening outward in the distal handpiece region and pushing the flexible cooling-fluid/rinsing-fluid hose through the guide tube or guide cannula so that the closed first end advances beyond a proximal tube entrance opening in the proximal handpiece region and protrudes from the guide tube or guide cannula; and
- cutting off the first end after the first end protrudes from the guide tube or guide cannula.

\* \* \* \* \*